(12) United States Patent
Murray et al.

(10) Patent No.: US 8,443,129 B1
(45) Date of Patent: May 14, 2013

(54) METHOD AND APPARATUS FOR IMPLEMENTING A DATA BUS INTERFACE

(75) Inventors: James J. Murray, Los Gatos, CA (US); Ting Lu, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 440 days.

(21) Appl. No.: 12/841,013

(22) Filed: Jul. 21, 2010

(51) Int. Cl.
*G06F 13/12* (2006.01)

(52) U.S. Cl.
USPC .......................................... 710/307; 710/66

(58) Field of Classification Search ............... 710/66, 710/307
See application file for complete search history.

(56) References Cited

U.S. PATENT DOCUMENTS

| | | | | |
|---|---|---|---|---|
| 4,878,166 A | * | 10/1989 | Johnson et al. | 710/307 |
| 5,471,632 A | * | 11/1995 | Gavin et al. | 710/104 |
| 5,590,378 A | * | 12/1996 | Thayer et al. | 710/30 |
| 6,101,565 A | * | 8/2000 | Nishtala et al. | 710/307 |
| 6,173,366 B1 | * | 1/2001 | Thayer et al. | 711/129 |
| 6,563,836 B1 | | 5/2003 | Capps et al. | |
| 7,085,865 B2 | * | 8/2006 | Haess et al. | 710/113 |
| 7,216,328 B2 | | 5/2007 | Hwang et al. | |
| 7,475,168 B2 | * | 1/2009 | Weber et al. | 710/35 |
| 8,006,021 B1 | * | 8/2011 | Li et al. | 710/306 |

OTHER PUBLICATIONS

Nass, Rich, "Xilinx puts ARM core into its FPGAs," *EE Times*, Apr. 27, 2010, pp. 1-2, www.eetimes.com.
Taylor, Brad et al., *28nm Generation Programmable Families*, Aug. 8, 2010, pp. 1-25, available from Xilinx, Inc., San Jose, California, USA.

\* cited by examiner

*Primary Examiner* — Paul R Myers
(74) *Attorney, Agent, or Firm* — LeRoy D. Maunu

(57) ABSTRACT

A data bus interface channel controller circuit for an N-bit data bus is described. A FIFO command queue is coupled to receive and buffer one or more commands formatted for M-bit transactions. A FIFO data queue is coupled to receive and buffer N-bit formatted data packets. A first translation circuit is coupled to the FIFO command queue and configured to translate the each commands into a selected one of a plurality of transaction formats. A transmission control circuit is coupled and configured to receive and transmit commands removed from the FIFO command queue. The transmission control circuit is configured to track a number of outstanding transmitted commands and, in response to receiving a command having a transaction format different from the previously received command, delay transmission of commands on the N-bit data bus until the number of outstanding transmitted commands equals zero.

20 Claims, 6 Drawing Sheets

METHOD AND APPARATUS FOR IMPLEMENTING A DATA BUS INTERFACE

FIELD OF THE INVENTION

The disclosed embodiments generally relate to data bus communication.

BACKGROUND

Programmable integrated circuits (ICs) may be programmed by a user to perform specified logic functions. One type of programmable logic device, known as a field programmable gate array (FPGA), is very popular because of a superior combination of capacity, flexibility, time-to-market, and cost. Programmable ICs provide the flexible hardware solutions ideal for high performance parallel computing required for advanced digital communications and video applications. For many complex applications, there has been a recent trend to implement a portion of the design in software and a portion of the design in programmable logic. Many manufacturers, such as Xilinx, Inc., include embedded processor systems in a number of programmable integrated circuits. These embedded processor systems offer an ideal combination to meet both the software and hardware programmable needs. Embedded processor systems often include operating memory, software instruction storage, input/output, and other components of a computer system. These systems are referred to as system on chip (SOC) solutions. In these systems, designers may implement complex functions in programmable logic to increase efficiency and throughput. This architectural combination gives an advantageous mix of serial and parallel processing, flexibility, and scalability, thereby enabling a more optimized system partitioning—especially in the areas of intelligent video, digital communications, machine systems, and medical devices.

Given the variety of options available to designers, a design may include several portions split between software and programmable logic of one or more integrated circuits. However, implementing a suitable arrangement for communication between different portions poses a challenge to designers. Data bus architectures provide a convenient method to communicate data between the various portions of a system. In a data bus architecture, one or more communication channels are shared by multiple devices. Communication on each channel is coordinated so that only one device communicates data on the channel at a given time. Data busses typically implement buffering of data. Buffering decouples the communication between devices from the processing of data. Through buffering, several commands or data packets can be received and buffered until the processing circuit is available.

Data busses may be implemented with a number of different data bus architectures such as the Peripheral Component Interconnect (PCI) and the Advanced Microcontroller Bus Architecture (AMBA) bus architectures. Designers typically implement interface circuits to communicate data to and from the data bus in a manner compliant with the chosen data bus protocol. However, because different cores and processors may communicate in different bit formats, implementation of interface circuitry can be challenging. The complexity of the interface circuitry may be further compounded if the data bus is to perform advanced communication functions not included in the base specification of the chosen data bus protocol.

The disclosed embodiments may address one or more of the above issues.

SUMMARY

In one embodiment, a method is provided for processing read transactions of multiple bit widths in a channel control queue of an N-bit data bus. One or more commands formatted for M-bit transactions are received. Each of the one or more commands are stored in a first-in-first-out queue. In response to determining N=M, the one or more commands are transmitted over the N-bit data bus in a first N-bit transaction format. In response to determining each of the one or more commands correspond to a burst of L transactions having $M*L \pmod N)=0$ and $N \neq M$, the one or more commands are transmitted over the N-bit data bus in a second N-bit transaction format. In response to determining $N \neq M$ and the one or more commands correspond to a burst of L transactions having $M*L \pmod N) \neq 0$, the one or more commands are transmitted over the N-bit data bus in a third N-bit transaction format. In response to transmitting a previous command, received immediately prior to the one or more commands, in a transaction format different from the transaction format of the one or more commands, transmission of the one or more commands on the N-bit data bus is delayed until processing of each transaction corresponding to the previous command is complete.

In another embodiment, in response to the determining $N \neq M$ and the one or more commands correspond to a burst of L transactions having $M*L \pmod N) \neq 0$, the transmission of the one or more commands on the N-bit data bus is delayed until processing of each transaction corresponding to the previous command is complete.

The storing of each of the one or more commands in a first-in-first-out queue in another embodiment stores the one or more commands in the N-bit transaction format used for transmission of the one or more commands on the N-bit data bus.

In another embodiment, the storing of the one or more commands in the N-bit transaction format used for transmission includes translating the one or more commands into a number of commands formatted for N-bit transactions. The number of commands formatted for N-bit transactions is stored in the first-in-first-out queue. The processing of each transaction corresponding to the previous command includes receiving an N-bit data packet transmitted over the N-bit data bus and converting the N-bit data packet into one or more M-bit data packets according to the transaction format of the corresponding command.

The delaying of the transmitting of the one or more commands on the N-bit data bus in another embodiment includes setting a blocking bit of a first one of the number of N-bit transaction format commands prior to storing the number of N-bit transaction format commands. The delaying transmission of the one or more commands on the N-bit data bus until processing of each transaction corresponding to the previous command is complete, is performed in response to removing one of the stored number of commands formatted for N-bit transactions having a blocking bit set from the first-in-first-out queue.

In another embodiment, the first N-bit transaction format is the same as the M-bit transaction format of the received one or more commands.

The second N-bit transaction format merges every $L*M/N$ transactions of the burst of L transactions into an N-bit transaction in another embodiment.

The third N-bit transaction format includes an N-bit data field having a lower M bits with data, and an upper N–M pad bits in another embodiment.

In another embodiment, data packets corresponding to and formatted according to the transaction format of one or more commands transmitted on the N-bit data bus are received and stored in a first-in-first-out data queue. Each of the data packets is removed from the first-in-first-out data queue and translated into an M-bit format corresponding to the M-bit transactions.

The M-bit format data packets are output in an order corresponding to an order in which the one or more commands for M-bit transactions are received in another embodiment.

A data bus interface channel controller circuit for an N-bit data bus is provided in another embodiment. A first-in-first-out (FIFO) command queue is coupled to receive and buffer one or more commands formatted for M-bit transactions from a first input. A FIFO data queue is coupled to receive and buffer N-bit formatted data packets from a second input. A first translation circuit is coupled to the FIFO command queue and configured to translate the one or more commands to a selected one of a plurality of transaction formats. A transmission control circuit is coupled and configured to receive and transmit commands removed from the FIFO command queue. The transmission control circuit is configured to track a number of outstanding transmitted commands and, in response to receiving a command having a format different from the previously received command, delay transmission of commands on the N-bit data bus until the number of outstanding transmitted commands equals zero.

In another embodiment, the first translation circuit is configured to translate the one or more commands to a first N-bit transaction format in response to determining N=M. The first translation circuit is further configured to translate the one or more commands into a second N-bit transaction format in response to determining the one or more commands correspond to a burst of L transactions having M*L (mod N)=0 and N≠M. In response to determining N≠M and the one or more commands correspond to a burst of L transactions having M*L (mod N)≠0, the first translation circuit is further configured to translate the one or more commands into a third N-bit transaction format.

The data bus interface channel controller circuit includes a second translation circuit configured to translate data packets, as removed from the FIFO data queue, according to the transaction format of the last transmitted command in another embodiment.

The first N-bit transaction format is the same as the M-bit transaction format of the one or more commands in another embodiment.

In another embodiment, the second N-bit transaction format merges every L*M/N transactions of the burst of L transactions into an N-bit transaction.

In another embodiment, the third N-bit transaction format includes an N-bit data field having a lower M bits with data, and an upper N–M pad bits.

An article of manufacture is provided in another embodiment. The article includes a storage medium configured with non-transitory configuration data that, when loaded onto a programmable integrated circuit, cause a set of programmable elements to operate as a data bus interface. The data bus interface is configured to receive and store one or more commands formatted for M-bit transactions in a first-in-first-out queue. In response to determining N=M, the data bus interface is configured to transmit the one or more commands over the N-bit data bus in a first N-bit transaction format. In response to determining each of the one or more commands correspond to a burst of L transactions having M*L (mod N)=0 and N≠M, the data bus interface is configured to transmit the one or more commands over the N-bit data bus in a second N-bit transaction format. In response to determining N≠M and the one or more commands correspond to a burst of L transactions having M*L (mod N)≠0, the data bus interface is configured to transmit the one or more commands over the N-bit data bus in a third N-bit transaction format. In response to transmitting a previous command, received immediately prior to the one or more commands, in a transaction format different from the transaction format of the one or more commands, the data bus interface circuit is configured to delay transmitting of the one or more commands on the N-bit data bus until processing of each transaction corresponding to the previous command is complete.

In another embodiment, the data bus interface, in response to the determining N≠M and the one or more commands correspond to a burst of L transactions having M*L (mod N)≠0, delays transmitting of the one or more commands on the N-bit data bus until processing of each transaction corresponding to the previous command is complete.

The data bus interface, in another embodiment, receives data packets corresponding to and formatted according to the transaction format of one or more commands transmitted on the N-bit data bus, and stores each of the data packets in a first-in-first-out data queue. The data bus interface removes each of the data packets from the first-in-first-out data queue and translate each data packet removed into an M-bit format corresponding to the M-bit transactions.

In another embodiment, the data bus interface stores each of the one or more commands in the first-in-first-out queue in the N-bit transaction format used for transmission of the one or more commands on the N-bit data bus.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
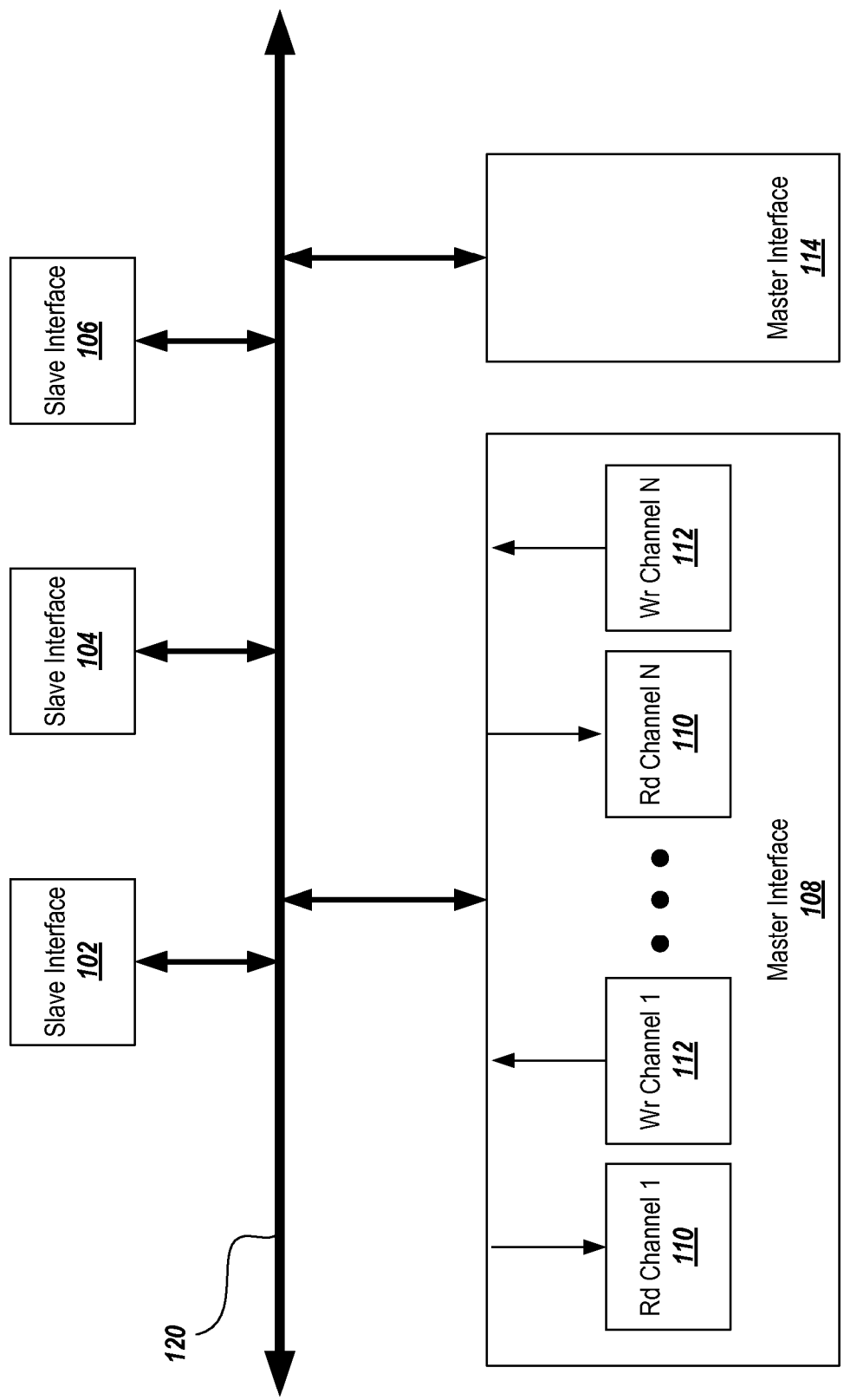
FIG. 1 shows a block diagram of an example AMBA AXI data bus.

Data busses may be implemented using a number of data bus architectures and protocols which implement a number of data bus features. Many data bus protocols implement pipelining, wherein read and write transactions may be initiated before previous outstanding transactions have completed. As used herein, a data bus read transaction is initiated by a read command transmitted by a master interface, and transactions are completed when a corresponding data packet is received in response to the read command and processed. If the data bus is implemented to complete transactions in the order issued, a slow processing of one device could prevent other transactions from completing even though other slaves are ready to transmit. To increase throughput, many data bus protocols allow transactions to be completed out of order. Out of order transactions can improve system performance because it enables parallel processing of transactions by slave devices. Faster memory regions can complete processing of transactions without waiting for earlier transactions to slower memory regions to complete.

Out of order transactions introduce additional complexity into the data bus interface circuits. For example, each data transfer is typically aligned and addressed according to the width of the data bus. However, in some applications the data packet size and addressing that is used by a master device may be different from the addressing and bit-width of the data bus. In these instances, it is possible that the address specified by the master device will not align with the address used by the data bus. For example, if 32-bit read commands are expanded to be compatible with a 64 bit data bus, the target data may be returned in either the upper bits or lower bits of the retrieved data packet depending on the alignment of the target address with the 64 bit addressing. Additionally, in some situations two sequential 32 bit read commands may be processed as one 64 bit read command. In this situation, the received data packet will contain target data corresponding to one 32-bit read command in the upper bits and target data corresponding to the other 32-bit read command in the lower bits.

In these situations, the interface must be configured to properly extract target data from a data block received from the data bus according to the format or alignment indicated by the read command(s). As used herein, the transaction format refers to the format and alignment of a read command and corresponding data packet of a data bus transaction. When transactions are processed out of order it can be difficult to determine the alignment and format of each received data packet. Previous methods utilized content addressable memory (CAM) structures to support out of order execution. However, CAM is disadvantageous because it is complex to design and verify. CAM imposes timing challenges in high throughput applications and consumes a large area in an IC.

The embodiments described herein provide a method and circuit for implementing a high throughput data bus interface in a manner that avoids complexities attributable to out of order processing and avoids the need for CAM. For ease of explanation, the following embodiments and illustrative examples are described with reference to the Advanced Microcontroller Bus Architecture (AMBA) Advanced Extensible Interface (AXI). AMBA AXI is a standardized protocol for communicating between master and slave devices on a data bus. Communication is implemented with separate address/control and data phases. Multiple outstanding read/write transactions may be issued and processed. The ability to issue multiple outstanding transactions allows multiple transactions to be issued in a burst mode where several sequentially addressed transactions may be initiated using only the starting address of the read/write transaction. The AMBA AXI protocol is fully described in the AMBA 3.0 specification.

FIG. 1 shows a block diagram of an example data bus implemented in accordance with AMBA AXI. In this example, slave data bus interfaces 102, 104, and 106 and master interfaces 108 and 114 are connected to data bus 120.

Each interface communicates data between a device having a unique address (not shown) and the data bus 120. As shown in master interface 108, each interface circuit may implement a plurality of read and write channels 110 and 112.

Figure 2:
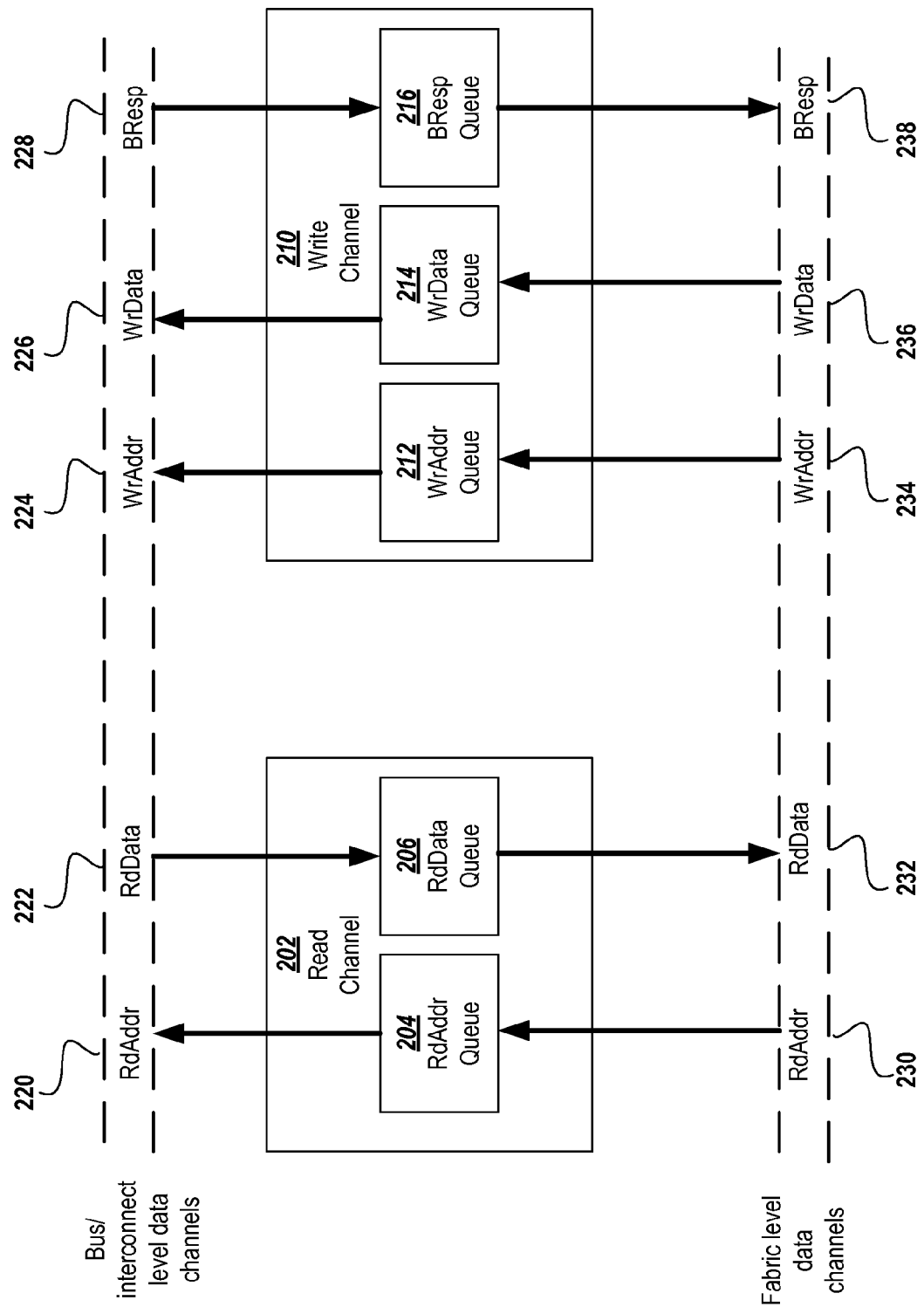
FIG. 2 shows a block diagram of an example master data bus interface circuit.

FIG. 2 shows a block diagram of an example master interface circuit for a data bus. In this example, the interface is configured with a read channel 202 and a write channel 210. The interface read channel 202 includes two first-in-first-out (FIFO) circuits (RdAddr Queue 204 and RdData Queue 206) for buffering received commands and data segments. Commands received from programmable IC fabric read channel 230 are buffered in read address ("RdAddr") queue 204. Processed read commands are transmitted on data bus interconnect RdAddr channel 220. Data block segments corresponding to issued commands are received from bus interconnect read data ("RdData") channel 222 and buffered in RdData queue 206. Queued data blocks are retrieved from RdData queue 206 on fabric level RdData channel 232.

The interface write channel 210 includes three FIFO circuits (WrAddr Queue 212, WrData Queue 214, and BResp Queue 216) for buffering received commands, data segments to be written, and response data received from slave devices. Commands and data segments received from programmable IC fabric write address ("WrAddr") and write data ("WrData") channels 234 and 236 are respectively buffered in WrAddr queue 212 and WrData queue 214. Processed write commands and data are respectively transmitted on data bus interconnect WrAddr channel 224 and WrData channel 226. Confirmation response data received on BResp channel 228 are buffered in BResp queue 216 and forwarded on programmable IC fabric channel BResp channel 238.

In the embodiments disclosed herein, the data bus interface is operated such that all outstanding transactions initiated by the interface are configured to have the same transaction format. If one or more commands to be transmitted are configured for a transaction format that is different from the transaction format of outstanding transactions, transmission of the one or more received commands is delayed until all outstanding transactions have completed. In this manner, the data bus interface will know the transaction format of each received data packet.

In one embodiment, the data bus interface is configured to translate M-bit read commands received from programmable IC fabric into read commands configured for transactions on an N-bit data bus according to several transaction formats. The interface is configured to determine the transaction format used for translation depending on the bit size, M, burst length of the transaction indicated by the command, and the data bus bit width, N.

For example, in one implementation, the data bus interface translates M-bit read commands received from programmable IC fabric into 64-bit read commands according to one of three transaction formats. If the bit size (M) of a command is 64 bits, the read command may be used without translation in the existing 64 bit transaction format. 32-bit read commands, which indicate an incremental burst mode transaction of a length that aligns to 64-bit boundaries, may be converted to a second transaction format, referred to as an upsized format. For an arbitrary programmable IC fabric and data bus bit widths M and N, an M bit command indicating a burst of length L is considered to be aligned to N bit boundaries of the data bus if M*L (mod N)=0 and N≠M. Because the burst mode transaction aligns to the 64 bit boundaries, the entire bit width of the data bus channel is utilized and the transaction is performed with 100% efficiency. 32-bit read commands that do not align to 64-bit boundaries (M*L (mod N)≠0) are translated to 64-bits according to a third transaction format, referred to as an expanded format. The translation of read commands to correspond to the expanded format results in the retrieved data packets being padded with 32 bits of unused data. Therefore, expanded transactions are transmitted with 50% efficiency.

Generally, burst mode transactions must be performed in sequential order. In the second transaction format described above, the ordering is preserved by encapsulating the burst within the 64-bit transaction. Since commands indicating burst mode transactions, which are translated according to the expanded transaction format, are not similarly encapsulated, they must be transmitted and processed in order.

Similarly, aligned burst mode commands that require a multiple number of N-bit transactions, will have to have each N-bit transaction processed sequentially. For example, if J M-bit commands can be represented in a single N-bit command, then for M-bit burst mode commands having M*L (mod N)=0 and a burst length of L>J, every L*M/N transactions of the burst can be translated into one command formatted for N-bit transactions. Although the transactions indicated by the N-bit commands must be processed in order, transmission on the data bus is performed with 100% efficiency. In this situation, the multiple N-bit transactions may be represented by a single burst mode command formatted for N-bit transactions.

The embodiments are not limited to the transaction formats described herein. One skilled in the art will understand that the embodiments may be configured to translate according to a number of other transaction formats. The transaction formats may be selected for translation of read commands having a fixed bit width, translation to a fixed data bus size, and/or automatic translation to and from any arbitrary bit width.

For non-burst mode transactions and burst mode transactions that are aligned to the bit width of the data bus, the embodiments are configured to control transmission of translated commands to allow out of order processing of multiple transactions. Transmission is controlled so that only transactions in the same transaction format may be outstanding at any given time. If a read command to be transmitted is formatted according to a transaction format that differs from the transaction format of outstanding transactions, the interface delays transmission of the read command until all outstanding transactions have completed. Therefore, the data bus interface can assume that received data packets will have the transaction format of current outstanding transactions.

Figure 3:
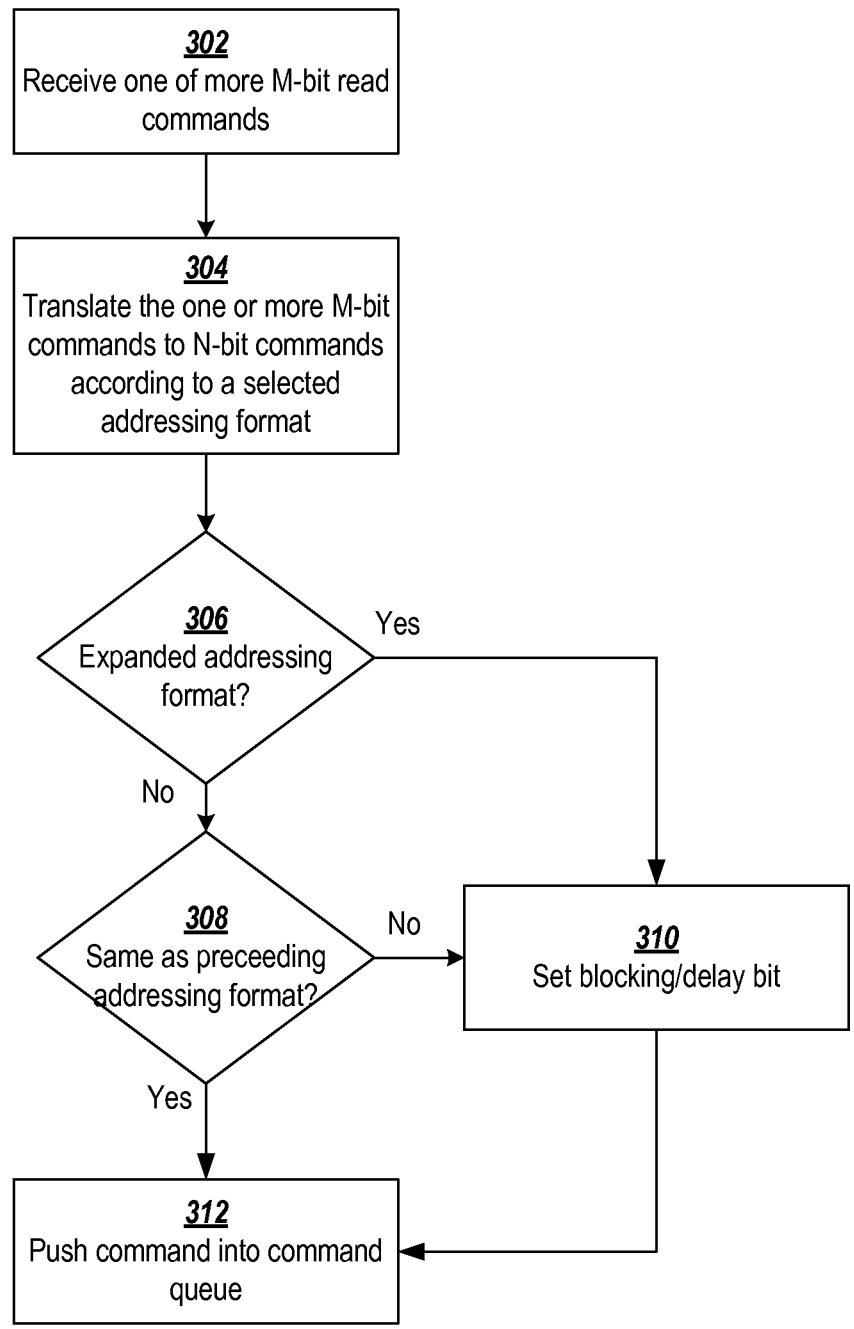
FIG. 3 shows a flowchart of a method for processing transactions in a data bus interface in accordance with one or more embodiments.

FIG. 3 shows a flowchart of a method for processing transactions in a data bus interface in accordance with one or more embodiments. In this example, commands are translated and compared prior to buffering in a read command queue to determine whether transmission of read commands is to be delayed. For ease of explanation, this example is limited to the three transaction formats described above. One or more M-bit read commands are received from programmable IC fabric by the data bus interface at step 302. The one or more M-bit read commands are translated to one or more N-bit read commands at step 304. The process determines whether to delay transmission of the each translated read command at steps 306 and 308. If the translated read command is in the expanded transaction format (decision step 306), a blocking/delay bit is set in the command at step 310. Otherwise, the transaction format of the translated read command is compared to the transaction format of the previous translated read command at decision step 308. If the compared transaction formats differ, the blocking/delay bit is set at step 310. The translated command is then buffered in the read command queue at step 312.

Figure 4:
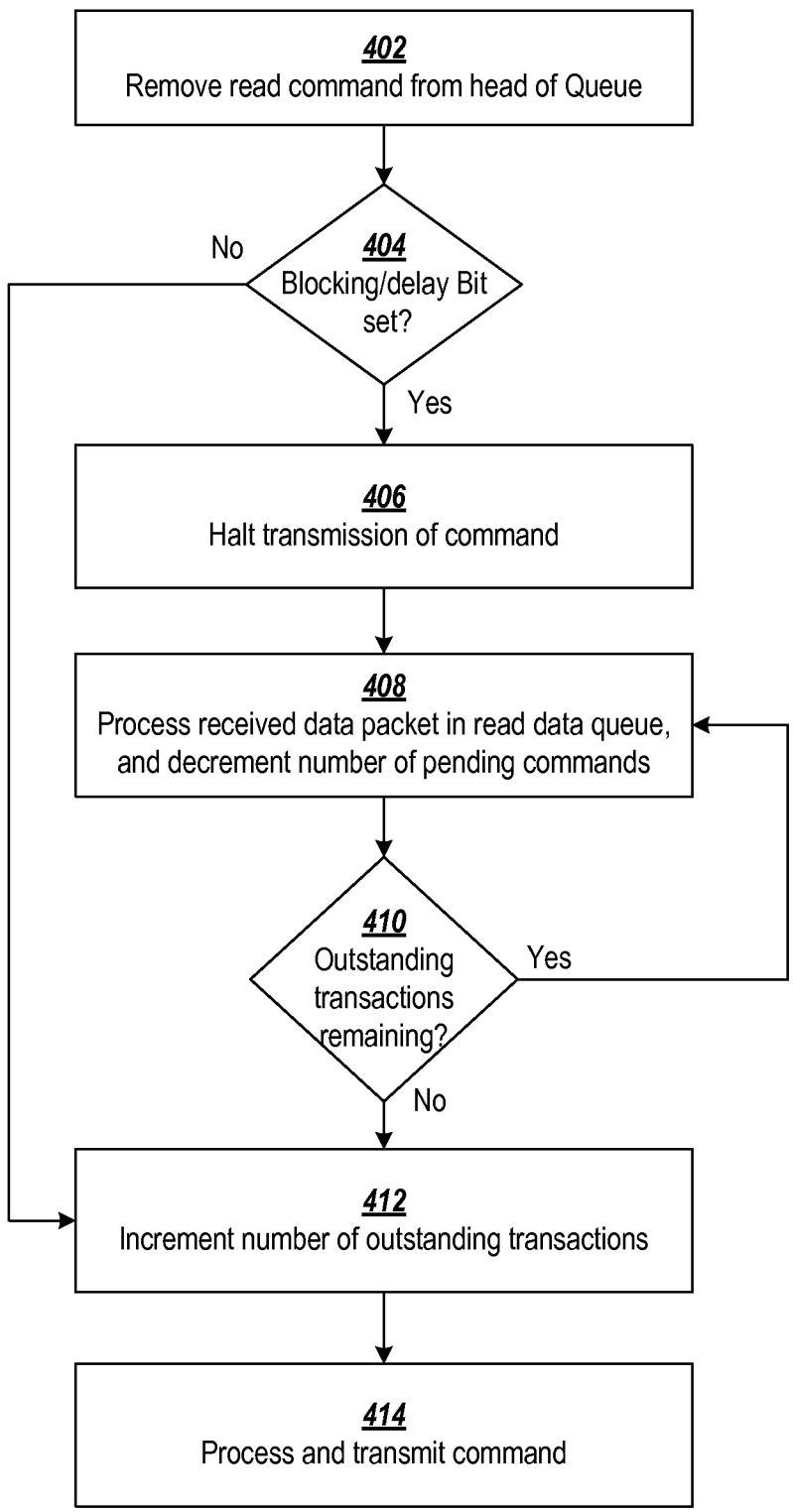
FIG. 4 shows a flowchart of a process for processing the read commands buffered in the process of FIG. 3.

FIG. 4 shows a flowchart of a process for processing the read commands buffered in the process of FIG. 3. A read command is removed from the head of the queue at step 402. If the blocking/delay bit is not set (decision step 404), a variable indicating the number of outstanding transactions is incremented at step 412. The command is processed and transmitted on the data bus at step 414. If the blocking/delay bit is set (decision step 404), transmission of the read command is halted at step 406. While the number of outstanding transactions is greater than zero, at decision step 410, data packets received and buffered in a data queue are processed at step 408. For each data packet removed from the data queue and processed, the number of outstanding transactions is decremented. When no outstanding transactions remain, the number of outstanding transactions is incremented at step 412. The command for which the transmission was halted in step 406 is processed and transmitted on the data bus at step 414.

In the example illustrated in FIGS. 3 and 4, the process compares transaction formats prior to buffering to determine whether transmission of each read command is to be delayed. One skilled in the art will recognize that transaction formats of the read commands may be analyzed when dequeued to determine whether transmission is to be delayed.

Figure 5:
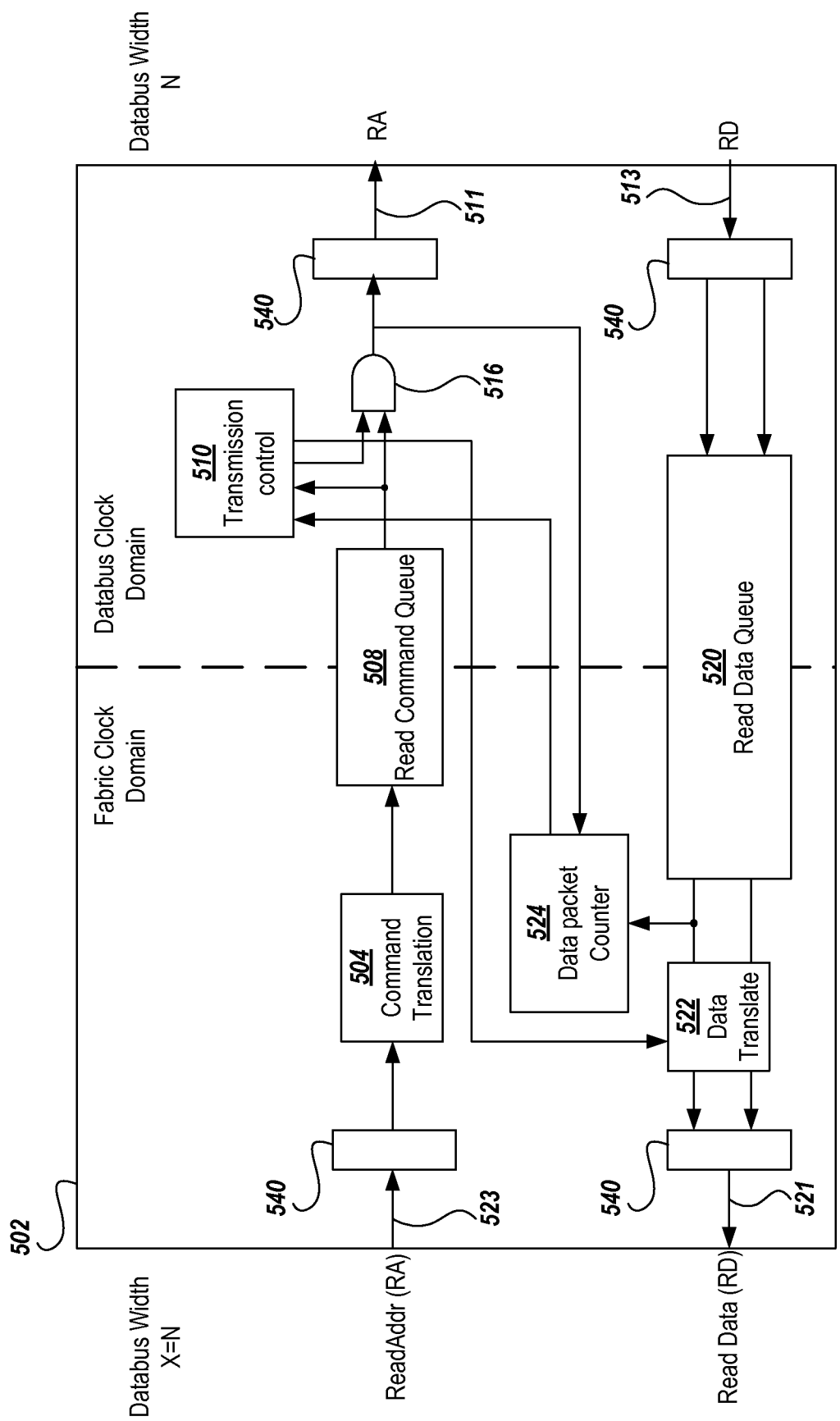
FIG. 5 shows a block diagram of an example circuit for implementing a data bus interface read channel circuit in accordance with one embodiment.

FIG. 5 shows a block diagram of an example circuit 502 for implementing a data bus interface read channel circuit in accordance with one embodiment. In this example, queued commands and data are asynchronously clocked between fabric and data bus clock domains. Register slices 540 are included for retiming input and output. One skilled in the art will recognize that synchronous operations may be implemented in a manner similar to that shown in FIG. 5.

Commands are received from the programmable IC fabric read address (RA) channel 523. Command translation circuit 504 converts one or more received commands from a first format configured for data bus width, M, to second format configured for data bus width, N. An asynchronous read command queue 508 is coupled to receive translated commands from the command translation circuit 504. Transmission control circuit 510 is coupled to receive command output from read command queue 508. The transmission control circuit 510 selectably disables transmission via AND gate 516 when the transaction format of the command differs from the format of outstanding transactions as described above.

When enabled by transmission control circuit 510, commands are transmitted over the data bus read address (RA) channel 511. Data packets of outstanding transactions are received on read data (RD) channel 513 and buffered in asynchronous read data queue 520. Data packets buffered in queue 520 are translated by data translation circuit 522 according to the current transaction format indicated by transmission control circuit 510. Translated data packets are made available to the programmable IC on the RD channel 521 of the programmable IC fabric.

Data packet counter 524 is configured to count commands transmitted on the data bus and data packets removed from data queue 520 to determine the number of outstanding transactions. Data packet counter 524 outputs the number of outstanding transactions to the transmission control circuit 510.

Those skilled in the art will appreciate that various alternative circuit arrangements, including circuitry to fully implement features of the chosen database architecture protocol, could be used to perform the processes of the different embodiments described herein.

Figure 6:
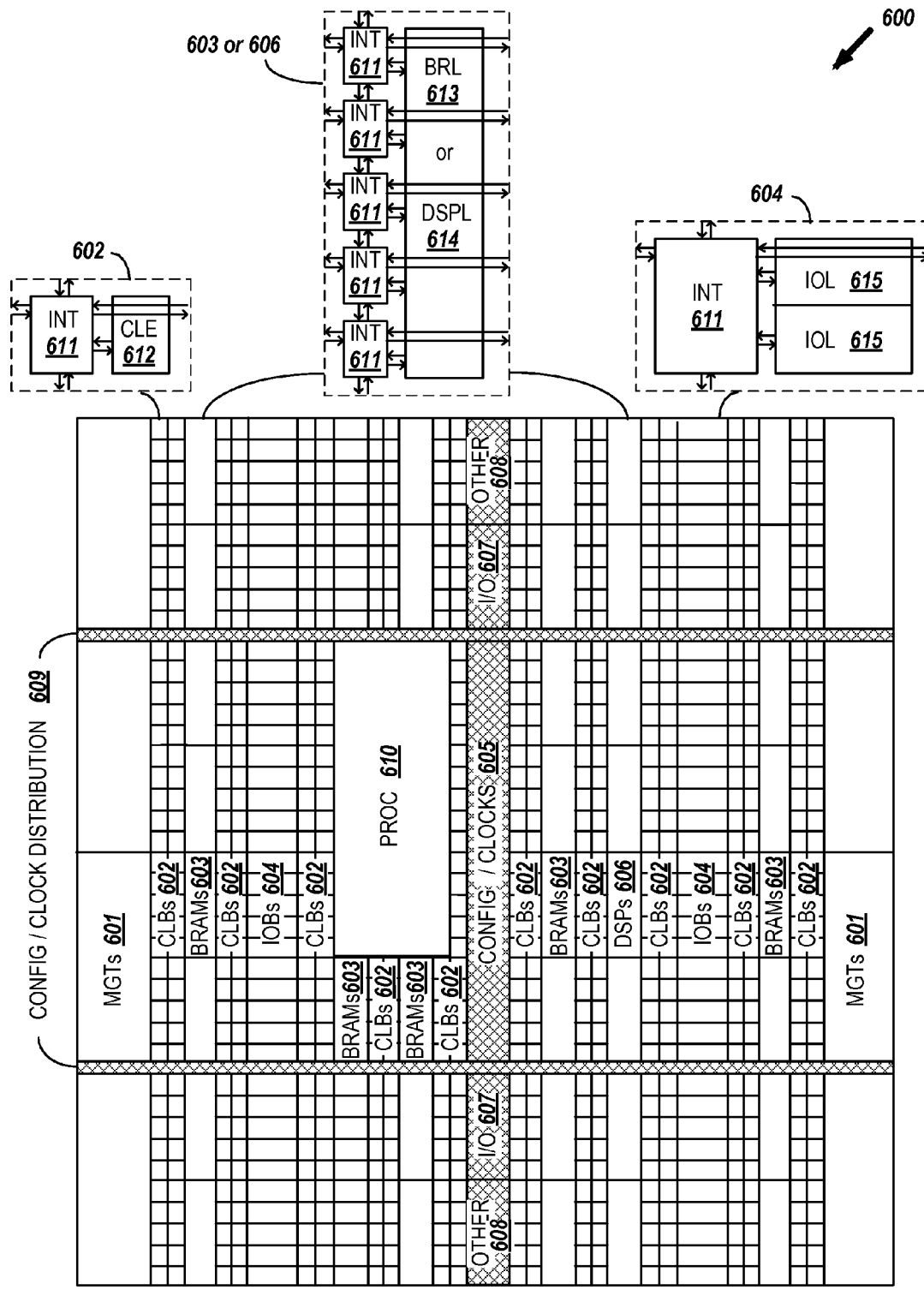
FIG. 6 shows a circuit diagram of an example programmable logic integrated circuit that may be configured to implement one of more data bus interfaces in accordance with one or more embodiments.

FIG. 6 is a block diagram of an example FPGA that may be configured to implement one or more data bus interface circuits in accordance with one or more embodiments. The data bus interface circuits may be implemented in programmable logic or using dedicated hardware. FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments.

The disclosed embodiments are thought to be applicable to a variety of applications utilizing data bus communication. Other aspects and embodiments will be apparent to those skilled in the art from consideration of the specification and practice of the embodiments disclosed herein. It is intended that the specification and illustrated embodiments be considered as examples only, with the true scope and spirit of the invention being indicated by the following claims.

What is claimed is:

1. A method for processing read transactions of multiple bit widths in a channel control queue of an N-bit data bus, the method comprising:
   receiving a plurality of commands formatted for M-bit transactions;
   storing each of the commands in a first-in-first-out queue;
   in response to determining N=M, transmitting the commands over the N-bit data bus in a first N-bit transaction format;
   in response to determining each of the commands corresponds to a burst of L transactions having M*L (mod N)=0 and N≠M, transmitting the commands over the N-bit data bus in a second N-bit transaction format;
   in response to determining N≠M and the commands corresponds to a burst of L transactions having M*L (mod N)≠0, transmitting the commands over the N-bit data bus in a third N-bit transaction format;
   in response to transmitting a previous command, received immediately prior to the commands and in a transaction format the same as the transaction format of the commands, transmitting the command on the N-bit data bus before processing of each transaction corresponding to the previous command is complete; and
   in response to transmitting a previous command, received immediately prior to the commands, in a transaction format different from the transaction format of the commands, delaying transmitting of the commands on the N-bit data bus until processing of each transaction corresponding to the previous command is complete.

2. The method of claim 1, further comprising, in response to the determining N≠M and the commands correspond to a burst of L transactions having M*L (mod N)≠0, delaying transmitting of the commands on the N-bit data bus until processing of each transaction corresponding to the previous command is complete.

3. The method of claim 1, wherein the storing of each of the commands in a first-in-first-out queue stores the commands in the N-bit transaction format used for transmission of the commands on the N-bit data bus.

4. The method of claim 3, wherein:
   storing the commands in the N-bit transaction format used for transmission includes:
      translating the commands formatted for M-bit transactions into a number of commands for N-bit transactions formatted according to the N-bit transaction format used for transmission of the commands; and
      storing the number of commands for N-bit transactions in the first-in-first-out queue; and
   the processing of each transaction corresponding to the previous command includes:
      receiving an N-bit data packet transmitted over the N-bit data bus; and converting the N-bit data packet into M-bit data packets according to the transaction format of the corresponding command.

5. The method of claim 4, wherein:
the delaying of transmitting of the commands on the N-bit data bus includes setting a blocking bit of a first one of the number of commands for N-bit transactions prior to storing the number of commands for N-bit transactions; and the delaying of transmitting of the commands on the N-bit data bus until processing of each transaction corresponding to the previous command is complete, is performed in response to removing one of the stored number of commands for N-bit transactions having a blocking bit set from the first-in-first-out queue.

6. The method of claim 1, wherein the first N-bit transaction format is the same as the M-bit transaction format of the received commands.

7. The method of claim 1, wherein the second N-bit transaction format represents each group of L*M/N transactions of the burst of L transactions as one command formatted for N-bit transactions.

8. The method of claim 1, wherein the third N-bit transaction format includes an N-bit data field having a lower M bits with data, and an upper N–M pad bits.

9. The method of claim 1, further comprising:
receiving data packets corresponding to and formatted according to the transaction format of commands transmitted on the N-bit data bus;
storing each of the data packets in a first-in-first-out data queue;
removing each of the data packets from the first-in-first-out data queue; and
translating each data packet removed from the data queue into an M-bit format corresponding to the M-bit transactions.

10. The method of claim 9, further comprising outputting the M-bit format data packets in an order corresponding to an order in which the commands for M-bit transactions are received.

11. A data bus interface channel controller circuit for an N-bit data bus, comprising
a first-in-first-out (FIFO) command queue coupled to receive and buffer a plurality of commands formatted for M-bit transactions from a first input;
a FIFO data queue coupled to receive and buffer N-bit formatted data packets from a second input;
a first translation circuit coupled to the FIFO command queue and configured to translate the commands to a selected one of a plurality of transaction formats; and
a transmission control circuit coupled to the FIFO command queue and configured to:
receive commands removed from the FIFO command queue;
track a number of outstanding transmitted commands;
in response to receiving a command having a transaction format the same as the transaction format of a previously received and transmitted command, allow transmission of the command on the N-bit data bus before processing of the transaction corresponding to the previously received and transmitted command is complete; and
in response to receiving a command having a transaction format different from the transaction format of a previously received and transmitted command, delay transmission of the command on the N-bit data bus until the number of outstanding transmitted commands equals zero.

12. The circuit of claim 11, wherein the first translation circuit is configured to:
translate, in response to determining N=M, the commands to a first N-bit transaction format;
translate, in response to determining the commands correspond to a burst of L transactions having M*L (mod N)=0 and N≠M, the commands into a second N-bit transaction format; and
translate, in response to determining N≠M and the commands correspond to a burst of L transactions having M*L (mod N)≠0, the commands into a third N-bit transaction format.

13. The data bus interface channel controller circuit of claim 11, further comprising a second translation circuit configured to translate data packets removed from the FIFO data queue according to the transaction format of the most recently transmitted command.

14. The circuit of claim 12, wherein the first N-bit transaction format is the same as the M-bit transaction format of the commands.

15. The circuit of claim 12, wherein the second N-bit transaction format represents each group of L*M/N transactions of the burst of L transactions as one command formatted for N-bit transactions.

16. The circuit of claim 12, wherein the third N-bit transaction format includes an N-bit data field having a lower M bits with data and an upper N–M of pad bits.

17. An article of manufacture, comprising:
a storage medium configured with non-transitory configuration data that when loaded onto a programmable integrated circuit cause a set of programmable elements to operate as a data bus interface, the data bus interface configured to perform operations including:
receiving a plurality of commands formatted for M-bit transactions;
storing each of the commands in a first-in-first-out queue;
in response to determining N=M, transmitting the commands over the N-bit data bus in a first N-bit transaction format;
in response to determining each of the commands correspond to a burst of L transactions having M*L (mod N)=0 and N≠M, transmitting the commands over the N-bit data bus in a second N-bit transaction format;
in response to determining N≠M and the commands correspond to a burst of L transactions having M*L (mod N)≠0, transmitting the commands over the N-bit data bus in a third N-bit transaction format;
in response to transmitting a previous command, received immediately prior to the commands and in a transaction format the same as the transaction format of the commands, transmitting the command on the N-bit data bus before processing of each transaction corresponding to the previous command is complete; and
in response to transmitting a previous command, received immediately prior to the commands and in a transaction format different from the transaction format of the commands, delaying transmitting of the commands on the N-bit data bus until processing of each transaction corresponding to the previous command is complete.

18. The article of manufacture of claim 17, wherein the data bus interface is further configured to delay, in response to the determining N≠M and the commands correspond to a burst of L transactions having M*L (mod N)≠0, transmitting of the commands on the N-bit data bus until processing of each transaction corresponding to the previous command is complete.

19. The article of manufacture of claim 17, wherein the data bus interface is further configured to perform operations including:
- receiving data packets corresponding to and formatted according to the transaction format of commands transmitted on the N-bit data bus;
- storing each of the data packets in a first-in-first-out data queue;
- removing each of the data packets from the first-in-first-out data queue; and
- translating each data packet removed from the data queue into an M-bit format corresponding to the M-bit transactions.

20. The article of manufacture of claim 17, wherein the storing of each of the commands in the first-in-first-out queue stores the commands in the N-bit transaction format used for transmission of the commands on the N-bit data bus.

* * * * *